United States Patent

Nybro

[11] Patent Number: 5,666,738
[45] Date of Patent: Sep. 16, 1997

[54] CALIBRATION AND MEASURING TOOL

[76] Inventor: Leif Nybro, PL 7690, S-450 73 Rabbalshede, Sweden

[21] Appl. No.: 525,578
[22] PCT Filed: Mar. 18, 1994
[86] PCT No.: PCT/SE94/00242
 § 371 Date: Sep. 18, 1995
 § 102(e) Date: Sep. 18, 1995
[87] PCT Pub. No.: WO94/21982
 PCT Pub. Date: Sep. 29, 1994

[30] Foreign Application Priority Data

Mar. 19, 1993 [SE] Sweden ................... 9300922

[51] Int. Cl.$^6$ ........................................ G01B 3/30
[52] U.S. Cl. ........................................ 33/567; 33/573
[58] Field of Search ................ 33/567, 502, 567.1, 33/573

[56] References Cited

U.S. PATENT DOCUMENTS 2,831,256  4/1958  Werle.
2,853,786  9/1958  Ellstrom, Sr. ................. 33/567
3,775,858  12/1973  Meyer.

FOREIGN PATENT DOCUMENTS

PCT/US92/
04379  12/1992  WIPO.

Primary Examiner—Christopher W. Fulton
Attorney, Agent, or Firm—Rolf Fasth

[57] ABSTRACT

A rod shaped supporting part has a plurality of plates slid thereon. Each plate has at least one protrusion protruding radially outwardly. The plates are axially separated by spacers. The protrusions have a precisely machined reference surface and the protrusions are arranged so that they form a helical path on the supporting part. The plates and spacers are held to the supporting parts by end nuts. At least two of the protrusions are protruding in the same direction so that a predetermined distance is defined between the protrusions which may be used in measuring applications. The supporting part is rotatably supported by a supporting device.

11 Claims, 1 Drawing Sheet

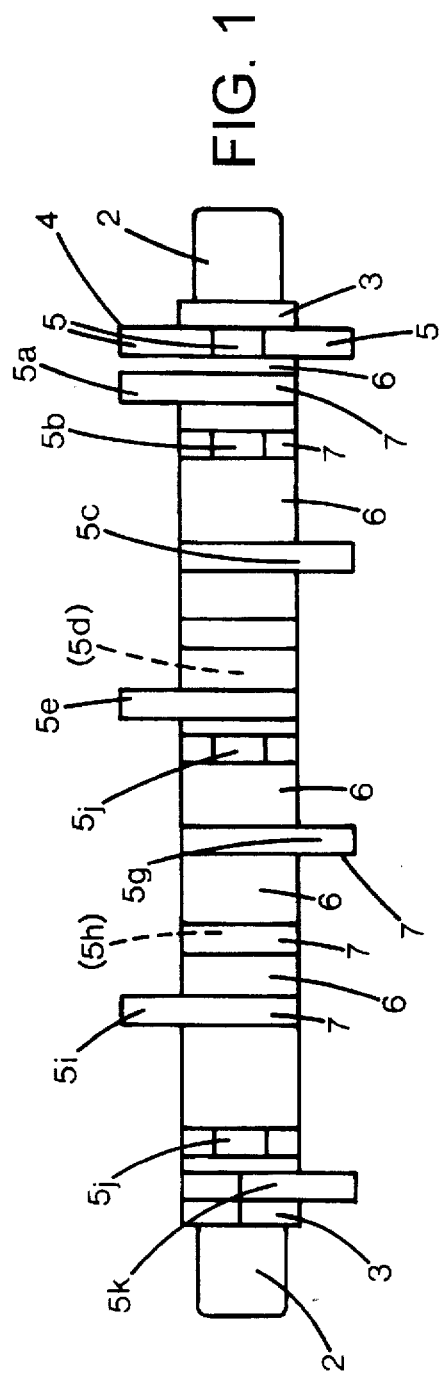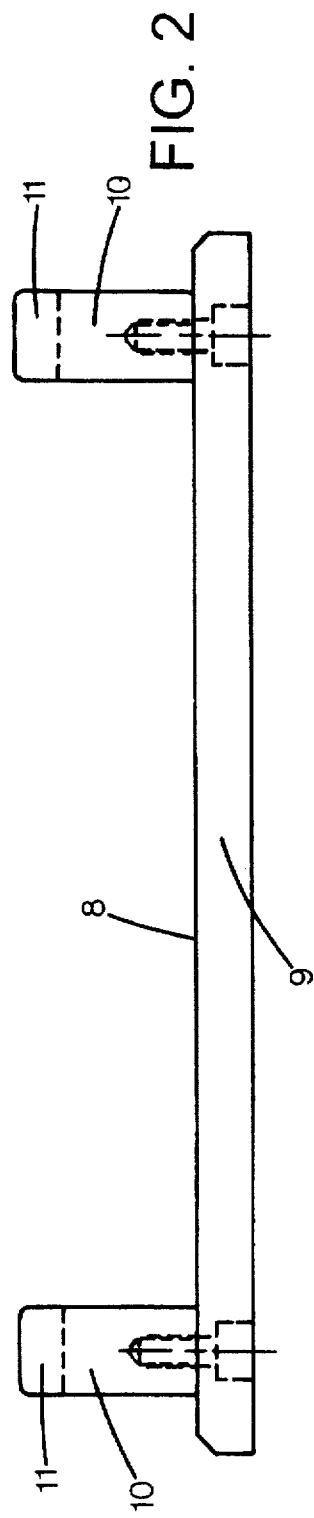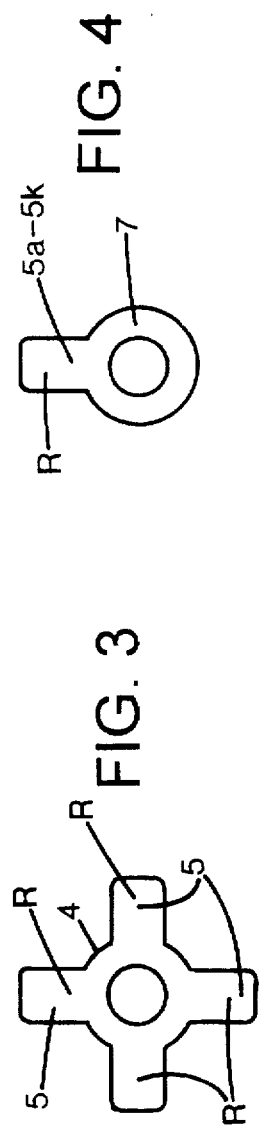

CALIBRATION AND MEASURING TOOL

TECHNICAL FIELD OF THE INVENTION

This invention relates to measuring and calibration tools and especially to such tools for calibration of for instance slide gages, micrometer calibrators, fixed gages and the like.

BACKGROUND OF THE INVENTION

For calibration purposes there are today a number of different tools the majority of which includes a rod shaped part and a number of projections aligned along the rod wherein reference surfaces are localized on either or both sides of said projections.

There are tools having essentially even pitch between the projections/reference surfaces and such where the distance between the reference surfaces varies according to set patterns. The known devices are adapted for calibration of measuring tools of a certain kind but are normally not utilized for just any measuring devices for instances such for internal measuring.

SUMMARY OF THE INVENTION

One aspect of the invention is to bring about a new type of calibration tool arranged in such a way that it can be used for practically all kinds of calibration or measuring tools and is easy to handle and operate without demanding specified supports.

The background for the invention is a demand for a universally useful calibration tool. It is to be possible to make a calibration in a simple and safe way of practically every kind of measuring devices utilized within the industry and with a minimum of trouble allow also switching between measuring devices shaped in different ways.

The new calibration tool includes a number of rigidly mounted plates separated by spacers or pads and localized one after the other, the majority of the plates having one projection and at least one plate having several, preferably four projections, which plate projections at least on one side has a reference surface facing in a longitudinal direction of the tool. The plates with the projections are fixedly arranged along a common carrier wherein the projections are oriented in such a way that the towards or from each other facing surfaces of two projections aligned with each other define a given distance of calibration. But for the plate or plates having several projections the plates are preferably localized in such a way that the projections essentially follow a helical line along the tool.

BRIEF DESCRIPTION OF THE DRAWINGS

A preferred embodiment of the tool according to the invention will be described in the following with reference to attached drawings, in which FIG. 1 is a sideview showing the calibration tool from one side, FIG. 2 is another sideview showing a support device for the tool, FIG. 3 is an axial view of a plate having four projections, and FIG. 4 is a similar view showing a plate having one projection.

DETAILED DESCRIPTION OF PREFERRED EMBODIMENT

A calibration tool as unit designated 1 is constructed round and along a central rod, not shown, having threaded ends and on this rod the parts mentioned below are mounted.

At the one end of the rod an end nut 2 is threaded and secured. A support pad 3 is placed against said nut and a first plate 4 having four projections 5 is slid on top thereof.

After the first plate 4 a spacer sleeve 6 having a defined length and a plate 7 with a reference surface projection 5a, and furtheron in turn spacer sleeves 6 and plates 7 with reference surface projections 5b–5k are mounted until the intended number has been reached, whereupon a further pad is mounted and the stack of spacers and plates and sleeves is tightened rigidly by means of an end nut 2 arranged at the opposite end of the rod. During the mounting the rod may be placed between four guiding rods ensuring a correct aligning of the various projections.

The first reference surface plate 4 has projections 5 projecting in all four directions and said projection can have carefully machined reference surfaces R on one or both sides. The single projection 5a of next plate, which projection may have a reference surface R on the one or both sides will be directed in the same direction as one of the four projections of the first plate and the following plates have their projections 5b–5k displaced 90° relatively to adjoining plates so that the projections will follow a helical line. In this way a considerable number of measuring or calibration spaces are created for control of measuring devices both for external and internal measuring, wherein in spite of the great number of calibration spaces all spaces are easy to reach. Even if you normally start at the plate 4 having several projections it is possible to mark the distances between pairs of projections extending in the same direction so that these can be used as calibration positions.

The tool 1 is intended to be supported by the stand device 8 shown in FIG. 2 which includes a base plate 9 and two end pillars 10 having recesses 11 in which the nuts 2 arranged at each end of the tool are intended to rest. A calibration tool resting against the pillars 10 is easily turned until projections appropriate to or fitting a certain calibration object and furtheron the tool 1 during the calibration work need not be removed from the pillars, lifted, turned and turned over implying the risk for mechanical damage the settings and for thermical bias due to the heat of the users hands.

The person performing the calibration thus leaves the tool resting on its stand the whole time, just makes it rotate relatively to the pillars if necessary.

The embodiment shown and described is one of several possible. Instead of using as shown a first plate 4 having four projections it is possible to have a plate with two, three or more than four projections. The possible number is dependent on the circumference taken at the projections and consequently you may have a greater number of projections at the first plate to cooperate with a corresponding greater number of separate projections at the other plates if the diameter or circumference is increased.

On the drawing there is shown a plate having several projections at the one end only. It is, of course, possible to have such a plate at each end of the rod and it is also as a further alternative possible to have plates presenting several projections at the one or both ends and one or several along the length of the rod.

In the latter case it may be practical to arrange the projections cooperating with one of the plates having several projections for internal measuring whereas the others are arranged for external measuring, wherein in the former case the outwardly facing sides are carefully machined whereas in the latter case the inwardly facing surfaces are the one most carefully machined.

I claim:

1. A calibration and measuring tool comprising:

a rod shaped supporting part having threaded opposite ends;

a first end nut screwed onto one end of the supporting part;

a first support spacer operatively engaging the supporting part and immediately adjacent the first end nut;

a first plate having an opening defined therethrough to be slid on the supporting part so that the first plate is immediately adjacent the first support spacer, the first plate having four projections attached thereto, the projections projecting radially outwardly in a first, second, third and fourth direction;

a first spacer sleeve having an opening defined therethrough to be slid on the supporting part and immediately adjacent the first plate;

a second plate having an opening defined therethrough to be slid on the supporting part so that the second plate is immediately adjacent the first spacer sleeve, the second plate having one projection attached thereto, the projection projecting radially outwardly in the first direction;

a second spacer sleeve having an opening defined therethrough to be slid on the supporting part and immediately adjacent the second plate;

a third plate having an opening defined therethrough to be slid on the supporting part so that the third plate is immediately adjacent the second spacer sleeve, the third plate having one projection attached thereto, the projection projecting radially outwardly in the second direction that is perpendicular to the first direction;

a third spacer sleeve having an opening defined therethrough to be slid on the supporting part and immediately adjacent the third plate;

a fourth plate having an opening defined therethrough to be slid on the supporting part so that the fourth plate is immediately adjacent the third spacer sleeve, the fourth plate having one projection attached thereto, the projection projecting radially outwardly in a third direction that is perpendicular to the second direction;

a fourth spacer sleeve having an opening defined therethrough to be slid on the supporting part and immediately adjacent the fourth plate;

a fifth plate having an opening defined therethrough to be slid on the supporting part so that the fifth plate is immediately adjacent the fourth spacer sleeve, the fifth plate having one projection attached thereto, the projection projecting radially outwardly in a fourth direction that is perpendicular to the third direction;

a fifth spacer sleeve having an opening defined therethrough to be slid on the supporting part and immediately adjacent the fifth plate;

a sixth plate having an opening defined therethrough to be slid on the supporting part so that the sixth plate is immediately adjacent the fifth spacer sleeve, the sixth plate having one projection attached thereto, the projection projecting radially outwardly in a first direction that is parallel to the first direction of the projection of the second plate;

a sixth spacer sleeve having an opening defined therethrough to be slid on the supporting part and immediately adjacent the sixth plate;

a seventh plate having an opening defined therethrough to be slid on the supporting part so that the seventh plate is immediately adjacent the sixth spacer sleeve, the seventh plate having one projection attached thereto, the projection projecting radially outwardly in a second direction that is parallel to second direction of the projection of the third plate;

a seventh spacer sleeve having an opening defined therethrough to be slid on the supporting part and immediately adjacent the seventh plate;

an eighth plate having an opening defined therethrough to be slid on the supporting part so that the eighth plate is immediately adjacent the seventh spacer sleeve, the eighth plate having one projection attached thereto, the projection projecting radially outwardly in a third direction that is parallel to the third direction of the projection of the fourth plate;

an eighth spacer sleeve having an opening defined therethrough to be slid on the supporting part and immediately adjacent the eighth plate;

a ninth plate having an opening defined therethrough to be slid on the supporting part so that the ninth plate is immediately adjacent the eighth spacer sleeve, the ninth plate having one projection attached thereto, the projection projecting radially outwardly in a fourth direction that is parallel to the fourth direction of the projection of the fifth plate;

a ninth spacer sleeve having an opening defined therethrough to be slid on the supporting part and immediately adjacent the ninth plate;

a tenth plate having an opening defined therethrough to be slid on the supporting part so that the tenth plate is immediately adjacent the ninth spacer sleeve, the tenth plate having one projection attached thereto, the projection projecting radially outwardly in an first direction that is parallel to first direction of the projection of the sixth plate;

a tenth spacer sleeve having an opening defined therethrough to be slid on the supporting part and immediately adjacent the tenth plate;

an eleventh plate having an opening defined therethrough to be slid on the supporting part so that the eleventh plate is immediately adjacent the tenth spacer sleeve, the eleventh plate having one projection attached thereto, the projection projecting radially outwardly in an second direction that is parallel to the second direction of the projection of the seventh plate;

an eleventh spacer sleeve having an opening defined therethrough to be slid on the supporting part and immediately adjacent the eleventh plate;

a twelfth plate having an opening defined therethrough to be slid on the supporting part so that the twelfth plate is immediately adjacent the eleventh spacer sleeve, the twelfth plate having one projection attached thereto, the projection projecting radially outwardly in a third direction that is parallel to the third direction of the projection of the eighth plate;

a second support spacer operatively engaging the supporting part and immediately adjacent the twelfth plate;

a second end nut screwed onto the end of the supporting part that is opposite the end attached to the first end nut;

each projection having a precisely machined reference surface; and a support bracket adapted to receive the first and second ends of the supporting part to rotatably support the supporting part.

2. A tool according to claim 1, wherein the protrusions form a helical path.

3. A tool according to claim 1, wherein the plates are arranged on the supporting part so that there are at least three projections protruding in the same direction.

4. A tool according to claim 1 wherein the plates are arranged on the supporting plates so that there are four projections protruding in the same direction.

5. A tool according to claim 1 wherein the supporting device includes a base plate having brackets attached thereto, the brackets having a recess defined therein adapted to receive the first and second support spacers to permit rotational movement of the supporting park on the supporting device.

6. A measuring tool comprising:

an elongate member having a first end and a second opposite end;

a first plate disposed on the elongate member adjacent the first end thereof, the plate having projections projecting in a first, second, third and fourth direction, each projection having a smooth surface facing away from the first end;

a second plate disposed on the elongate member axially spaced from the first plate, the second plate having a projection projecting in the first direction;

a third plate disposed on the elongate member axially spaced from the second plate, the third plate having a projection projecting in the second direction that is perpendicular to the first direction;

a fourth plate disposed on the elongate member axially spaced from the third plate, the fourth plate having a projection projecting in the third direction that is perpendicular to the second direction;

a fifth plate disposed on the elongate member axially spaced from the fourth plate, the fifth plate having a projection projecting in the fourth direction that is perpendicular to the third direction, the fifth plate being adjacent the second end of the elongate member;

the projections of the second, third, fourth and fifth plate each having a smooth surface facing the smooth surfaces of the first plate; and a support bracket adapted to receive the first and second end of the elongate member to rotatably support the elongate member.

7. A measuring tool according to claim 6 wherein each plate has a central opening defined therethrough to be slid onto the elongate member.

8. A measuring tool according to claim 7 wherein the plates are firmly attached to the elongate member.

9. A measuring tool according to claim 6 wherein the smooth surfaces are parallel to one another.

10. A measuring tool according to claim 6 wherein the elongate member has threaded ends and nuts are screwed thereon to hold the plates therebetween.

11. A measuring tool according to claim 6 wherein the plates are axially spaced by spacers placed between the plates on the elongate member.

* * * * *